United States Patent
Wen et al.

(10) Patent No.: US 6,208,401 B1
(45) Date of Patent: Mar. 27, 2001

(54) LIQUID CRYSTAL PANEL AND METHOD FOR PRODUCING THE SAME

(75) Inventors: Chun-Hsiang Wen; Shu-Huei Cheng; Hua-Chi Cheng, all of Hsinchu; Yaw-Ting Wu, Ping-Chen; Ming-Hsiang Chan, Chutung, all of (TW); Jun-Ichi Yasukawa, Chigasaki; Hajime Kuwahara, Narashino, both of (JP)

(73) Assignees: Industrial Technology Research Institute, Hsinchu (TW); Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/356,626

(22) Filed: Jul. 19, 1999

(51) Int. Cl.[7] ................................... G02F 1/1339
(52) U.S. Cl. ........................... 349/155; 349/156
(58) Field of Search ..................... 349/155, 156

(56) References Cited

U.S. PATENT DOCUMENTS 4,874,461   10/1989   Sato et al. .
6,002,462 * 12/1999   Sato et al. ............................. 349/106

FOREIGN PATENT DOCUMENTS 1-94320  *  4/1989  (JP) ..................................... 349/155
6-222370     8/1994  (JP) .
10-48643 *  2/1998  (JP) ..................................... 349/155

* cited by examiner

Primary Examiner—James A. Dudek
(74) Attorney, Agent, or Firm—Alston & Bird LLP

(57) ABSTRACT

The invention discloses a liquid crystal panel which is characterized in that each color filter is compartmentalized by the black matrix and the spacers are positioned on the region confined by the black matrix and the spacer bottom connects the first conductive film. The invention also discloses a process for producing liquid crystal panel, which is characterized in that the color filters and spacers are produced by coating a four-level photoresist and by a first exposure step which is masked by a four-level photoresist; the red region, green region and blue region are produced by development and electro-deposition; and the spacers are produced by a second exposure step which is masked by a spacer reticle, a development step which emerges the first conductive film within a region confined by the black matrix, and a step of electrodeposition coating compositions on the emerged region of the first conductive film. The spacers position and sizes could be easily determined by spacer reticle and high quality display performances could be achieved.

12 Claims, 2 Drawing Sheets

LIQUID CRYSTAL PANEL AND METHOD FOR PRODUCING THE SAME

BACKGROUND OF THE INVENTION

1. Field of the Invention

The present invention relates to a liquid crystal panel and a method for producing the same and, more particularly to a liquid crystal panel which is produced by lithography and electro-deposition and a method for producing the same.

2. Description of the Related Art

Personal computers and monitors prevail in recent years because of the rapid development of information and multimedia. A liquid crystal display (LCD), as a solution of reducing environmental pollution, has been proposed to replace a display tube as a main display device. Therefore, it is required that LCD should be as high display quality as the display tube is. However, there are lots of problems to be overcome in reaching the goal.

A liquid crystal panel, especially color one shown in FIG. 1, includes a color filter substrate 10, a liquid crystal driving substrate 8, and a liquid crystal material 9 in cells within the gap between the color filter substrate 10 and the liquid crystal driving substrate 8. The cell gap, usually from several microns to dozens of microns in length, is formed by spacers 7. Conventionally, the spacers are plastic or glass pellets distributed on a second conductive film 2'. It is hard to distribute the pellets uniformly in this method, and thus nonuniform cell gap and poor display quality arise, especially in large scale display panels. Furthermore, the light is subject to scattering and thus inducing a poor contrast because the pellets may be distributed on a red filter 4, a green filter 5 and a blue filter 6. Still, the pellets will move in cells while the liquid crystal material 9 is filled, and will disconnect driving wires.

U.S. Pat. No. 4,874,461 discloses a liquid display panel in which the spacers are produced by photolithographic process. The spacers are easy to shed since photocure process incompleteness may occur in production, and uniformity in size is poor. Japanese Patent Publication No. HEI-6-222370 discloses stripy stria spacers. The resolution is poor because of utilizing negative photoresist and the spacer patterns are limited.

SUMMARY OF THE INVENTION

One object of the present invention is to provide a liquid crystal panel in which the thickness and uniformity of the spacer are easy to control and small cell gap and excellent display quality could be obtained.

Another object of the present invention is to provide a liquid crystal panel in which no spacer is placed on effective display filters and display quality can be improved.

A further object of the present invention is to provide a process for producing a liquid crystal panel in which the thickness and uniformity of spacers can be effectively controlled. A small and uniform cell gap could be obtained.

Another further object of the present invention is to provide a process for producing a liquid crystal panel in which spacers are all positioned on a black matrix rather than effective display filters.

A still further object of the present invention is to provide an improved process for producing a liquid crystal panel. The process improves the product yield and display quality, and can be applied in large-scale LCDs.

To achieve the above objects, the present invention discloses a liquid crystal panel, comprising a liquid crystal driving substrate, a color filter substrate disposed under the liquid crystal driving substrate, a liquid crystal material disposed between the liquid crystal driving substrate and the color filter substrate and a plurality of spacers; in which the color filter substrate comprises a glassy substrate, a first conductive film disposed on the glassy substrate, color filters, a black matrix and a second conductive film disposed on the color filters; and characterized in that each color filter is compartmentalized by the black matrix, the spacers are positioned on the region confined by the black matrix, and the bottom of the spacer contacts the first conductive film. In preferred embodiments of the invention, the spacers are polymeric compositions and made by electro-deposition and the thickness of the spacer is controlled by electro-deposition. The spacers are light or thermal hardened resins which are black or opaque. Alternatively, the spacers are light or thermal hardened resins which are transparent or colored.

To achieve the above objects, the present invention discloses a process for producing a liquid crystal panel, comprising producing a liquid crystal driving substrate, a color filter substrate disposed under the liquid crystal driving substrate, a liquid crystal material disposed between the liquid crystal driving substrate, and the color filter substrate, and a plurality of spacers; wherein the process of producing the color filter substrate comprising the step of producing a glassy substrate, a first conductive film disposed on the glassy substrate, color filters, a black matrix, and a second conductive film disposed on the color filters; and characterized in that the color filters and spacers are produced by: coating four-level photoresist on the first conductive film, exposing the photoresist for the first time with four-level photoresist, producing the red, green and blue regions by repetitive development and electro-deposition, exposing the photoresist for the second time with a spacer reticle, revealing the first conductive film within a region confined by the black matrix by development, and electrodeposition coating compositions on the revealed first conductive film. In another embodiment of the invention, the electro-deposition compositions are light or thermal hardened resins which are black or opaque, or are light or thermal hardened resins which are transparent or colored. The position and size of the spacer are determined by the spacer reticle and the spacer thickness of the spacer is controlled by electrodeposition conditions coating compositions for producing the spacers. The four-level photoresist is positively photosensitive resin.

DETAILED DESCRIPTION OF THE INVENTION

Figure 1:
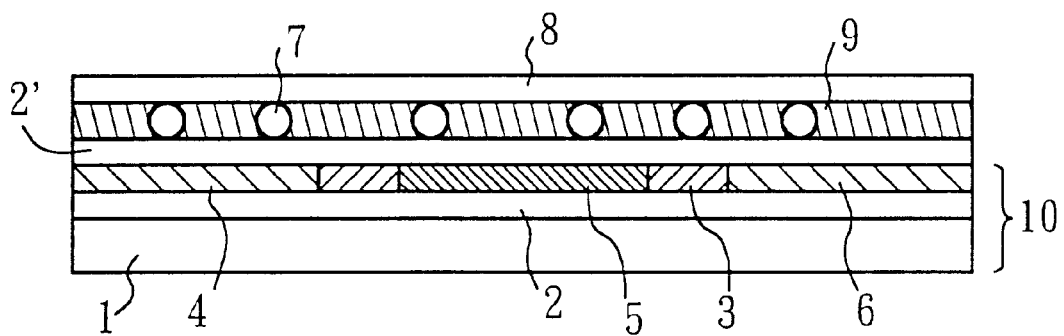
FIG. 1 is a cross-sectional diagram of a conventional liquid crystal panel.

The present invention relates to a liquid crystal panel having color filters (4, 5, 6) and a liquid crystal driving substrate 8 spaced for a fixed distance from the filters by spacers 7. The spacers 7 are made of polymeric electro-deposition paints, which could be black paints used for forming a black matrix or uncolored ones wherein the black paints could be carbon black disclosed in Japanese Patent Publication No. HEI-2-36622. The spacers could be also made of red, green or blue paints disclosed in Japanese Patent Publication No. HEI-2-36622. In other words, the spacers are black electro-deposition paints or non-black ones.

The spacers may be made of the same material as the black matrix in case the black matrix is formed by electro-deposition. However, the spacers could be colored ones when a chromium black matrix board (hereinafter referred to as "CrBM board") is applied. The black matrix is formed from chromium by photolithography. However, a black spacer is preferable in avoiding light dispersion.

The process for producing spacers within a region confined by the black matrix is described as follows.

1. Formation of color filters

A transparent conductive film 2 was produced on a transparent substrate 1 or a chromium black matrix (CrBM) substrate, and a four-level photoresist (hereinafter referred to as "MDPR") according to U.S. Pat. No. 5,641,595 was coated on the substrate. The material of transparent conductive film 2 and process for coating MDPR are disclosed in U.S. Pat. No. 5,641,595.

Exposing the MDPR with ultraviolet light which was masked by a four-level photoresist (hereinafter referred to as "MDPM") or a reticle of different exposure light intensities varying with each color part of the color filters (4, 5, 6). The red, green and blue parts of the color filters (4, 5, 6) are then electro-deposited on respective regions of the conductive film 2. The regions are formed by developing repeatedly the MDPR with a MDPM having a pattern of different light transmittances. During the development, portion of the conductive film 2 will be revealed in the order that the MDPM having the greatest light transmittance is applied first and then the MDPM having less light transmittances. The sequence of depositing different colors on the revealed conductive film is not fixed. Unlike the prior art, the color parts of the color filters (4,5,6) are finished in one step of exposure.

2. Formation of spacers

Figure 4:
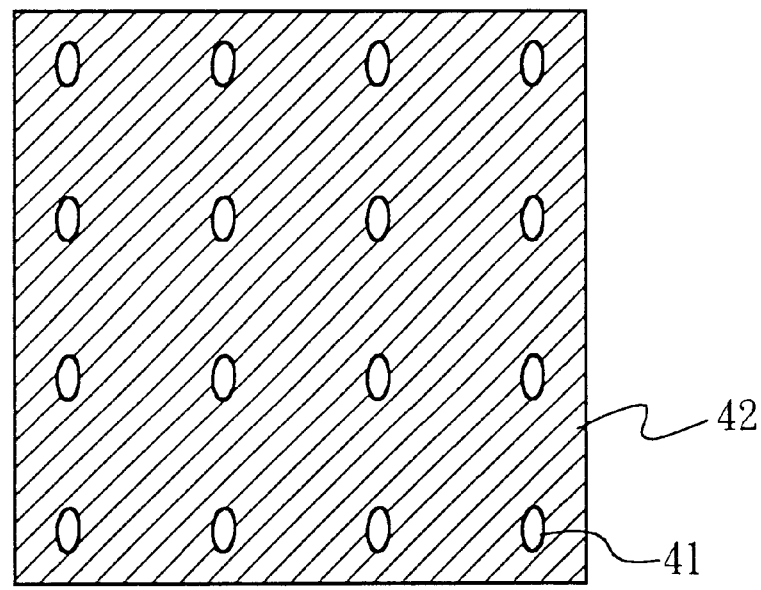
FIG. 4 depicts a spacer reticle.

In the second exposure step, a spacer reticle shown in FIG. 4 is utilized to form spacers. Light will pass through light-emitting areas 41 to expose the MDPR and be baffled by a light-masking area 42. After development, parts of the transparent first conductive film 2 which are used for depositing spacers 51 are revealed. The revealed parts of the transparent second conductive film 2 is then electro-deposited with polymeric electro-deposition compositions at high voltage and temperature for a long period of time in order to form spacers 51.

3. Formation of black matrix

After formation of spacers, the substrate 10 is exposed by ultraviolet light and residual MDPR is removed due to development. When the substrate having the transparent conductive film 2 is used, the black matrix is formed by electro-depositing a black polymeric electro-deposition composition on the region in which the MDPR is removed. When the substrate having CrBM is used, it is not necessary for any further process after MDPR development since the black matrix was originally formed on the substrate.

Furthermore, when the substrate having CrBM is utilized, a two-order positively sensitive photoresist is coated by spinning on the substrate instead of a four-level photoresist since substrate itself is conductive. A spacer reticle shown in FIG. 4 is utilized in the revealed regions for forming spacers on the substrate having CrBM after exposure and development. The spacers 7 are formed by electro-deposition at high voltage and temperature for a long period of time. The substrate is then exposed by ultraviolet light to remove all residual photoresist. A color filter with spacers is thus formed.

EXAMPLES

The invention is further described in the following examples. The MDPR, electro-deposition paints of red, green and blue parts are disclosed in U.S. Pat. No. 5,641,595. The black polymeric electro-deposition paints are described as follows.

<Example for producing black polymeric electro-deposition paints>

Polyester resins, black pigment and titanium oxide were blent by dissolving stirrer in advance and were then dispersed by DCP disperser. After diluted by ion-exchanged water, black polymeric electro-deposition paints BM-98 containing 10% in weight solid components were produced. Table 1 shows the compositions.

TABLE 1 compositions of BM-98

| Raw material | Composition | Weight percentage |
| --- | --- | --- |
| pigment 1 | Degussa SP-550 | 12.5 |
| pigment 2 | titanium oxide (Dupont R-706) | 4.1 |
| polyester resin | Shinto Paint S-453 | 29.8 |
| melamine resin | Mitsui cyanamid cymel 232 | 11.0 |
| neutralizer | DIPA | 3.0 |
| solvent 1 | PGM | 3.0 |
| solvent 2 | DAA | 34.0 |
| deforming agent | Surfynol 104 | 1.0 |
| dispersant | BYK-190 | 1.6 |
| Total | | 100.0 |

Example 1

Figure 2:
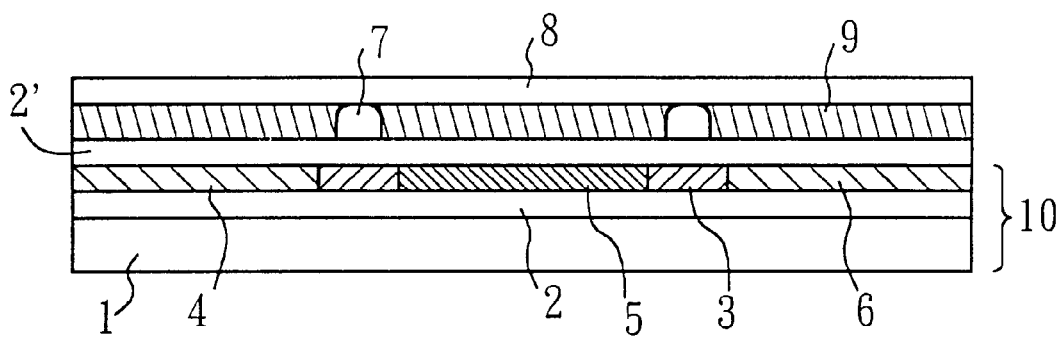
FIG. 2 is a cross-sectional diagram of a liquid crystal panel according to one embodiment of the invention.

In FIG. 2, a cross-sectional diagram of a liquid crystal panel formed with MDPR and by electro-deposition according to one embodiment of the invention is shown.

Formation of color filters

Coating MDPR (not shown in the figure) by spin coater on a 0.18 $\mu$m thick first transparent conductive film 1 (ITO) 2 which is disposed on a 0.7 mm thick glassy substrate 1. After drying at 90° C. for 20 minutes, a 2.0 $\mu$m thick positively sensitive photoresist was formed. The MDPR was exposed to ultraviolet light of density 250 mj/cm$^2$. The ultraviolet light was generated by high pressure mercury exposing equipment and masked with a four-level reticle MDPM.

The development was produced by 0.3 wt. % potassium hydroxide solution and the MDPR exposed by ultraviolet light passing through patterns on the MDPM of 100% light transmission rate was selectively developed. A patterned conductive film, normally indium tin oxide (hereinafter referred to as ITO), was revealed. After water rinsing and drying, anion type red electro-deposition paints R-75 made by Chemitron was electro-deposited with the transparent substrate as an anode on the revealed region of the conductive film under the operation conditions of 25° C. paint temperature and direct current voltage of 48V for 13 seconds. After rinsed by ion-exchanged water and dried at 100° C. for 10 minutes, a 1.7 $\mu$m thick red electro-deposition film was formed and the red part 4 of the color filters shown in FIG. 2 was accomplished.

Then the second development was proceeded by 0.6 wt. % potassium hydroxide solution and the MDPR exposed by ultraviolet light passing through MDPM of 40% light transmission rate was selectively developed. Another ITO was revealed. After water rinsing and drying, anion type green electro-deposition paints G-74 made by Chemitron was electro-deposited with the transparent substrate as an anode on the revealed region of the conductive film under the operation conditions of 25° C. paint temperature and direct current voltage of 64V for 19 seconds. After rinsed by ion-exchanged water and dried at 100° C. for 10 minutes, a 1.7 $\mu$m thick green electro-deposition film was formed and the green part 5 of the color filters shown in FIG. 2 was accomplished.

Then the third development was proceeded by 1.0 wt. % potassium hydroxide solution and the MDPR exposed by ultraviolet light passing through MDPM of 20% light transmission rate was selectively developed. Still another ITO was revealed. After water rinsing and drying, anion type blue electro-deposition paints B-74 made by Chemitron was electro-deposited with the transparent substrate as an anode on the revealed region of the conductive film under the operation conditions of 25° C. paint temperature and direct current voltage of 54V for 19 seconds. After rinsed by ion-exchanged water and dried at 100° C. for 10 minutes, a 1.7 $\mu$m thick blue electro-deposition film was formed and the blue part 6 of the color filters shown in FIG. 2 was accomplished.

Formation of spacers

So far, remaining MDPR are on the substrate formed with the red, green and blue parts. Then, the substrate was exposed by ultraviolet light of density 100 mj/cm$^2$ masked by spacer reticle. The exposed MDPR was selectively developed by 1.0 wt. % potassium hydroxide solution and part of the conductive films (ITO) is revealed. After water rinsing and drying, anion type black electro-deposition paints BM-98 made by Chemitron was electro-deposited with the transparent substrate as an anode on the revealed region of the conductive film under the operation conditions of 27° C. paint temperature and direct current voltage of 70V for 25 seconds. After rinsed by ion-exchanged water and dried at 100° C. for 10 minutes, a 7.0 $\mu$m thick black spacer electro-deposition film was formed and the spacer 7 shown in FIG. 2 was accomplished.

Formation of black matrix

The substrate was wholly exposed by ultraviolet light of density 1000 mj/cm$^2$. Remaining MDPR was developed by 1.5 wt. % potassium hydroxide solution and a conductive film (ITO) without any electro-deposition compositions thereon was revealed. After water rinsing and drying, anion type black electro-deposition paints BM-98 made by Chemitron was electro-deposited with the transparent substrate as an anode on the ITO under the operation conditions of 25° C. paint temperature and direct current voltage of 30V for 10 seconds. After rinsed by ion-exchanged water and dried at 100° C. for 10 minutes, a 1.9 $\mu$m thick black matrix electro-deposition film was formed and the black matrix 3 shown in FIG. 2 was accomplished. The OD value is 3.0, which is adequate in shielding light.

Fabrication of liquid display panel

A second transparent conductive film 2' was formed on the color filter substrate 10. A liquid crystal material 9 such as a TFT liquid crystal composition was filled between the substrate and the liquid crystal driving substrate 8 such as a TFT board. A liquid crystal panel was thus produced and has less variation in the cell gap. No spacer is formed on effective display parts. Excellent display quality could thus be obtained.

Example 2

Figure 3:
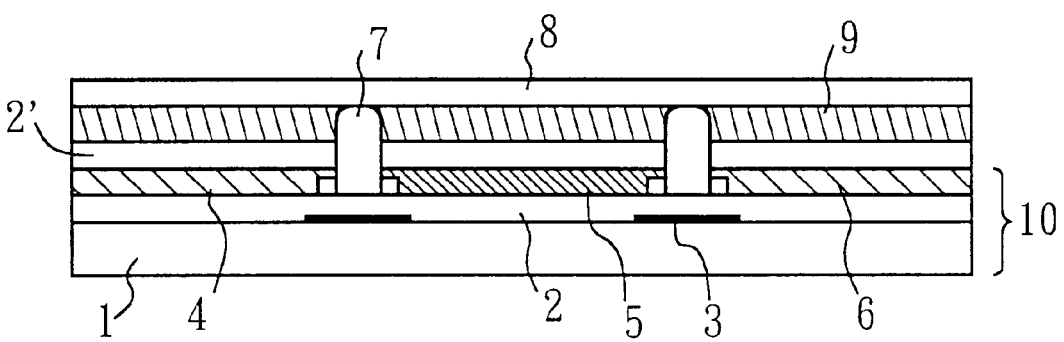
FIG. 3 is a cross-sectional diagram of a liquid crystal panel according to another embodiment of the invention.

With reference to FIG. 3, a cross-sectional diagram of a liquid crystal panel according to another embodiment of the invention is illustrated. A chromium black matrix board was used as a substrate.

Formation of color filters

Coating MDPR (not shown in the figure) by spin coater on a 0.18 $\mu$m thick first transparent conductive film 2 and chromium black matrix 3 which is disposed on a 0.7 mm thick glassy substrate 1. The chromium black matrix 3 was originally formed on the substrate. After dried at 90° C. for 20 minutes, a 2.0 $\mu$m thick positively sensitive photoresist was formed. The foregoing procedures of Example 1 were followed in forming color filters.

Formation of spacers

Followed the steps in Example 1 and the spacer 7 shown in FIG. 3 was accomplished.

Formation of black matrix

The substrate was exposed totally by ultraviolet light of density 1000 mj/cm$^2$. Remaining MDPR was developed by 1.5 wt. % potassium hydroxide solution and the ITO with a chromium film was revealed. The remaining steps were the same as those exemplified in Example 1.

Example 3

Color filters having red, green and blue parts were formed by pigment dispersion method on CrBM board made by STI Technology Inc. To produce spacers, ultraviolet light of density 200 mj/cm$^2$ masked by a spacer reticle shown in FIG. 4 was applied on a positive photoresist which was spin coated on the substrate. The exposed MDPR was selectively developed by 1.0 wt. % potassium hydroxide solution and then a chromium film was revealed. After water rinsing and drying, anion type black electro-deposition paints BM-98 made by Chemitron was electro-deposited on the chromium film under the operation conditions of 27° C. paint temperature and 70V direct current voltage for 25 seconds. After rinsed by ion-exchanged water and dried at 100° C. for 10 minutes, 7.0 $\mu$m thick black spacers were formed.

Effects of the invention

Figure 5:
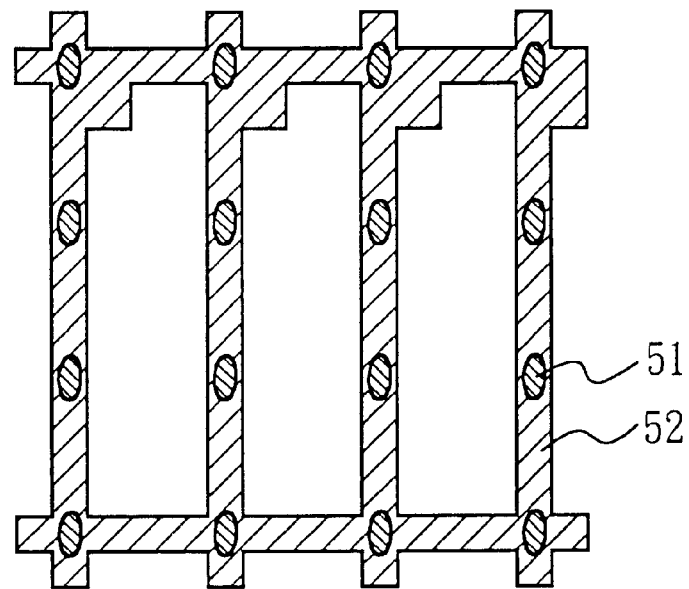
FIG. 5 depicts spacers on a black matrix.

The spacer 51 could be produced efficiently by using MDPR and electro-deposition on the black matrix 52 shown in FIG. 5. The liquid crystal panel has small cell gaps and performs excellent display quality having less variations. Furthermore, since the spacers are formed on the black matrix rather than on effective display parts, the display quality is excellent and the poor display quality caused by spacers will not happen.

With the disclosed invention, apparently numerous modifications and variations can be made without departing from the scope and spirit of the present invention. Therefore the present invention is intended to be limited only as indicated in the following claims.

What is claimed is:

1. A liquid crystal panel, comprising: a liquid crystal driving substrate, a color filter substrate disposed under the liquid crystal driving substrate, a liquid crystal material disposed between the liquid crystal driving substrate and the color filter substrate and a plurality of spacers; in which the color filter substrate comprises: a glassy substrate, a first conductive film disposed on the glassy substrate, color filters, a black matrix and a second conductive film disposed on the color filters; and characterized in that: each color filter is compartmentalized by the black matrix and the spacers are positioned on a region confined by the black matrix and the bottom of spacers are contact with the first conductive film.

2. The liquid crystal panel according to claim 1, wherein the spacers are polymeric compositions and made by electro-deposition.

3. The liquid crystal panel according to claim 1, wherein the thickness of the spacers is controlled by electro-deposition.

4. The liquid crystal panel according to claim 1, wherein the spacers are light or thermal hardened resins which are black or opaque.

5. The liquid crystal panel according to claim 1, wherein the spacers are light or thermal hardened resins which are transparent or colored.

6. A process for producing a liquid crystal panel, comprising producing a liquid crystal driving substrate, a color filter substrate disposed under the liquid crystal driving substrate, a liquid crystal material disposed between the liquid crystal driving substrate and the color filter substrate and a plurality of spacers; wherein the process of producing the color filter substrate comprising the step of producing a glassy substrate, a first conductive film disposed on the glassy substrate, color filters, a black matrix, and a second conductive film disposed on the color filters; and characterized in that the color filters and spacers are produced by:

coating a four-level photoresist on the first conductive film;

exposing the photoresist for the first time with a four-level reticle;

producing the red, green and blue regions by repetitive development and electro-deposition;

exposing the photoresist for the second time with a spacer reticle;

revealing the first conductive film within a region confined by the black matrix by development; and electrodeposition coating compositions on the revealed first conductive film.

7. The process for producing a liquid crystal panel according to claim 6, wherein the electro-deposition compositions are light or thermal hardened resins which are black or opaque.

8. The process for producing a liquid crystal panel according to claim 6, wherein the electro-deposition compositions are light or thermal hardened resins which are transparent or colored.

9. The process for producing a liquid crystal panel according to claim 6, wherein the position and size of the spacer are determined by the spacer reticle.

10. The process for producing a liquid crystal panel according to claim 6, wherein the thickness of the spacer is controlled by electrodeposition coating compositions for producing the spacers.

11. The process for producing a liquid crystal panel according to claim 6, wherein the spacers of all are positioned on a region confined on the black matrix.

12. The process for producing a liquid crystal panel according to claim 6, wherein a four-level photoresist is positively photosensitive resin.

* * * * *